United States Patent
Liu et al.

(10) Patent No.: US 11,971,258 B2
(45) Date of Patent: Apr. 30, 2024

(54) GENERATION SYSTEM AND METHOD FOR HIGH-PRECISION THREE-DIMENSIONAL NAVIGATION MAP OF FULLY MECHANIZED MINING SURFACE

(71) Applicant: CHINA UNIVERSITY OF MINING AND TECHNOLOGY, Xuzhou (CN)

(72) Inventors: Wanli Liu, Xuzhou (CN); Shirong Ge, Xuzhou (CN); Shibo Wang, Xuzhou (CN); Shixue Yi, Xuzhou (CN)

(73) Assignee: CHINA UNIVERSITY OF MINING AND TECHNOLOGY, Xuzhou (CN)

( * ) Notice: Subject to any disclaimer, the term of this patent is extended or adjusted under 35 U.S.C. 154(b) by 355 days.

(21) Appl. No.: 17/607,864

(22) PCT Filed: Sep. 3, 2019

(86) PCT No.: PCT/CN2019/104100
§ 371 (c)(1),
(2) Date: Oct. 29, 2021

(87) PCT Pub. No.: WO2020/228189
PCT Pub. Date: Nov. 19, 2020

(65) Prior Publication Data
US 2022/0205786 A1 Jun. 30, 2022

(30) Foreign Application Priority Data

May 14, 2019 (CN) .......................... 201910397230.9

(51) Int. Cl.
*G01C 21/00* (2006.01)
*E21C 35/24* (2006.01)
(Continued)

(52) U.S. Cl.
CPC ............ *G01C 21/005* (2013.01); *E21C 35/24* (2013.01); *E21C 39/00* (2013.01); *G01S 7/4808* (2013.01); *G01S 17/89* (2013.01); *G06T 17/05* (2013.01)

(58) Field of Classification Search
None
See application file for complete search history.

(56) References Cited

U.S. PATENT DOCUMENTS

| 6,616,244 B2 * | 9/2003 | Hakkinen ............ G05D 1/0274 |
| | | 299/30 |
| 2003/0052529 A1 * | 3/2003 | Hakkinen ............... E21C 35/24 |
| | | 299/1.05 |

(Continued)

FOREIGN PATENT DOCUMENTS

| CN | 102221832 A | 10/2011 |
| CN | 109059942 A | 12/2018 |

(Continued)

OTHER PUBLICATIONS

Liu, Peng et al., Automatic Height Adjustment Method For Shearer Drums Based On Pose Measurement And Coal Seam DEM, Journal of China Coal Society, vol. 40, No. 2, Feb. 28, 2015 (Feb. 28, 2015), ISSN:0253-9993, pp. 470-475.

(Continued)

*Primary Examiner* — Lina Cordero
(74) *Attorney, Agent, or Firm* — SOROKER AGMON NORDMAN PTE LTD

(57) ABSTRACT

A generation system and method for a high-precision three-dimensional navigation map of a fully mechanized mining surface, applicable to use in the technical field of unmanned mining. The generation system comprises a channel wave seismometer, a laser radar, a combined navigation device, a ground penetrating radar, and a data processing unit; the data processing unit acquires data collected by sensors; perform (Continued)

coordinate conversion, feature fusion and consistency processing on the collected data to generate a Delaunay triangle network of a coal seam, a fault/fold, and a roadway; draw a high-precision profile map of the triangle map, calculate a topological relation of the profile map, generate a topological data structure of the profile map, establish a navigation information automatic query database platform based on the high-precision profile map, and construct the high-precision three-dimensional navigation map of the fully mechanized mining surface. The high-precision three-dimensional navigation map generated by the present invention can provide accurate thickness information of the coal seam, a varied dip angle of the coal seam and a position of a dangerous geological structure space to fully mechanized mining equipment, and has functions such as high-precision positioning, information sensing, and path planning.

6 Claims, 1 Drawing Sheet

(51) Int. Cl.
*E21C 39/00* (2006.01)
*G01S 7/48* (2006.01)
*G01S 17/89* (2020.01)
*G06T 17/05* (2011.01)

(56) References Cited

U.S. PATENT DOCUMENTS

2016/0333690 A1* 11/2016 Puura ...................... E21D 9/003
2016/0333691 A1* 11/2016 Puura ................... G05D 1/0251
2016/0341041 A1* 11/2016 Puura ..................... G05D 1/024

FOREIGN PATENT DOCUMENTS

| CN | 110118550 A | 8/2019 |
| WO | 0169041 A1 | 9/2001 |

OTHER PUBLICATIONS

Zhang, Hao et al., Study On Key Technologies Of Unmanned Driving Shearer, Industry and Mine Automation, vol. 42, No. 2, Feb. 29, 2016 (Feb. 29, 2016), ISSN: 1671-251x, pp. 31-33.

Ge, Shirong, Key Technology Of Intelligent Coal Mining Equipment, Coal Science and Technology, vol. 42, No. 9, Sep. 30, 2014 (Sep. 30, 2014), ISSN:0253-2336, pp. 7-11.

* cited by examiner

GENERATION SYSTEM AND METHOD FOR HIGH-PRECISION THREE-DIMENSIONAL NAVIGATION MAP OF FULLY MECHANIZED MINING SURFACE

TECHNICAL FIELD

The present invention relates to a generating system and a generating method, in particular to a system for generating a high-precision three-dimensional navigation map of a fully mechanized mining face and a method thereof, which are applicable to the technical field of unmanned mining.

BACKGROUND ART

Unmanned mining in coal mines is a frontier technology pursued in the international coal mining field, which is an important means for reducing casualties and ensuring safe production, as well as an effective way to achieve safe, efficient and green mining in coal mines in China. Presently, unmanned mining can be realized by utilizing a combination of memory cutting and manual remote intervention at mining faces where the geological conditions and the coal seam structure are relatively simple. However, the geological conditions and the coal seam structures at most of the mining faces in China are very complex (e.g., the coal seam fluctuates greatly, and there are hazardous geological structures such as faults and folds), making it impossible to realize unmanned mining with existing techniques in the prior art.

SUMMARY OF THE INVENTION

Technical problem: in view of the shortcomings of the above-mentioned technology, the present invention provides a system for generating high-precision three-dimensional navigation map of fully mechanized coal mining face and a method therefor, the method has simple steps and is convenient for application, which can be achieved in full automation and with high precision.

To achieve the above-mentioned technical object, a system for generating a high-precision three-dimensional navigation map of a fully mechanized mining tee provided in the present invention comprises a vehicle-mounted mobile measurement platform and in-seam seismographs arranged on the two side of a coal seam to be ruined, wherein the in-seam seismographs comprises transmitters arranged at intervals in an upper roadway and receivers arranged at intervals in a lower roadway, and the receivers are connected with each other through network cables and connected with a wireless transmitter;

the vehicle-mounted mobile measurement platform is provided with a data receiving processor, a laser radar, an inertial navigation device and a ground penetrating radar, wherein the data receiving processor and the ground penetrating radar are fixed above the vehicle-mounted mobile measurement platform, the laser radar is fixed above the data receiving processor, the inertial navigation device is fixed at the center of the vehicle-mounted mobile measurement platform, the laser radar, the inertial navigation device and the ground penetrating radar transmit data with the data receiving processor through the network cables, and a receiver of the in-seam seismograph transmit data with the data receiving processor via the wireless transmitter.

the transmitters are in-seam seismic signal transmitters and the receivers are in-seam seismic signal receivers, the in-seam seismic signal receivers transmit data to the data receiving processor via the wireless transmitter, and the in-seam seismic signal transmitters are arranged corresponding to the in-seam seismic signal receivers to form an in-seam seismic signal detection sequence.

A method for generating a high-precision three-dimensional navigation map of a fully mechanized mining face comprises the following steps:

a. moving the vehicle-mounted mobile measurement platform at a constant speed of about 40 km/h in an upper roadway, a left cross roadway, a lower roadway and a right cross roadway around the coal seam to be mined;

b. moving the data receiving processor to a location near the wireless transmitter along with the vehicle-mounted mobile measurement platform to acquire the geological data of the coal seam to be mined collected by the in-seam seismographs by means of wireless signals, the geological data includes the thickness information of the coal seam to be mined, the varying inclination angle of the coal seam and the spatial locations of hazardous geological structures;

emitting a laser beam from the laser radar to the surface of roadway roof continuously, and calculating the distance between the roadway surface and the laser radar according to the return tune difference of the received reflected laser beam to form three-dimensional point cloud data of the roadway; transmitting the three-dimensional point cloud data from the laser radar to the data receiving processor through a network cable;

calculating the position, attitude and movement trajectory information of the vehicle-mounted mobile measurement platform with the inertial navigation device according to the rotational angular velocity and acceleration vector of the vehicle-mounted mobile measurement platform relative to the inertial system, and then transmitting the information to the data receiving processor through a network cable connection;

emitting electromagnetic wave signals from the ground penetrating radar to the coal seam at the roadway roof via an emitter unit, and accurately calculating the thickness data of the remaining coal in the upper and lower roadway roofs of the fully mechanized mining face with a receiver unit by detecting the propagation time of the electromagnetic wave signals in the coal seam, and transmitting the data to the data receiving processor through a network cable connection;

c. carrying out coordinate transformation, feature fusion and consistency processing on the data collected by the vehicle-mounted mobile measurement platform and the in-seam seismographs;

d. processing the data collected by the vehicle-mounted mobile measurement platform and the in-seam seismographs with the data receiving processor, and generating a Delaunay triangular meshwork of the coal seam, faults/folds and roadways at the fully mechanized mining face to be mined respectively;

e. utilizing the Delaunay triangular meshwork of the coal seam, faults/folds and roadways generated in the step d to plot a high-precision profile map of the Delaunay triangular meshwork, calculating the topological relationship of the profile map, and generating a topological data structure of the profile map;

f. creating an automatic querying database of the navigation information of the fully mechanized mining face to be mined, including the querying for thickness of coal seam, inclination angle of coal seam, spatial locations of faults/folds and spatial locations of roadways, and generating a high-precision three-dimensional navigation map of the fully mechanized mining face, according to the data collected by the vehicle-mounted mobile measurement platform and the in-seam seismographs and the created Delaunay triangular meshwork and high-precision profile map of the coal seam, faults folds and roadways at the fully mechanized mining face.

the method for coordinate transformation, feature fusion and consistency processing of the data collected by the vehicle-mounted mobile measurement platform and the in-seam seismographs is as follows: first, formulating identical and similar attribute features by categorizing and classifying the collected data elements and mapping the feature attributes according to the invariable features of the fully mechanized mining face organizing and expressing the attribute features with the least square method, and establishing an attribute feature conversion table to eliminate the differences in the attribute features resulted from different categorization and classification criteria and thereby achieve consistency of the collected data in feature expression; then, combining the collected data attribute features with a method based on entity matching with the same names:

specifically, a seven-parameter coordinate transformation method is used for the coordinate transformation:

$$\begin{pmatrix} X \\ Y \\ Z \end{pmatrix} = (1+m) \begin{pmatrix} X' \\ Y' \\ Z' \end{pmatrix} + \begin{pmatrix} 0 & \varepsilon_Z & -\varepsilon_Y \\ -\varepsilon_Z & 0 & \varepsilon_X \\ \varepsilon_Y & -\varepsilon_X & 0 \end{pmatrix} \begin{pmatrix} X' \\ Y' \\ Z' \end{pmatrix} + \begin{pmatrix} \Delta X \\ \Delta Y \\ \Delta Z \end{pmatrix}$$

where, $(X, Y, Z)^T$ are the three-dimensional coordinates of the coal seam to be mined, $(X', Y', Z')^T$ are the three-dimensional coordinates of the laser-scanned roadway; $\Delta X$, $\Delta Y$ and $\Delta Z$ are translation parameters between the two origins of coordinates, $\varepsilon_X$, $\varepsilon_Y$ and $\varepsilon_Z$ and are rotation parameters of the three coordinate axes, and m is a scale parameter;

wherein the feature fusion method of the data collected by the vehicle-mounted mobile measurement platform (1) and the in-seam seismographs employ at least one of following methods for fusion: the parameterized template method, the feature compression and clustering algorithm, the K-order nearest neighbor approximation algorithm, the artificial neural network and the fuzzy integral method, the steps of generating a Delaunay triangular meshwork of the coal seam, faults/folds and roadways at the fully mechanized mining face to be mined comprise:
  d1 first, sorting all the data involved in the network construction, including the data of the coal seam, faults/folds, and roadways scanned by the laser and the roof data detected by the ground penetrating radar, in an ascending order and in the sequence of coordinate X, then coordinate Y and then coordinate Z, and then storing the sorted data in a point data linked list;
  d2 creating a point data grid index according to the point data linked list, managing the point data in blocks, and storing the constraint edges in a linear linked list;
  d3 sequentially retrieving the constraint edges as base edges from the linear linked list, applying a maximum included angle criterion to generate a left triangle and a right triangle as an initial triangular mesh or generate a triangle if the constraint edges are boundaries, and storing the triangle(s) in the initial triangular mesh;
  d4 using the three edges of a layer of triangles newly generated in the step d3 as base edges, and generating a new triangular meshwork by using a one-step growth method: retrieving a base edge, finding out a third point that constitutes a triangle with the base line under a constraint circle criterion for constrained Delaunay triangulation, connecting the two end points of the base line with the third point to form a new triangle, and storing the new triangle in the triangular meshwork till the expansion edge of the new triangle is a boundary edge or has been used twice;
  d5 repeating the step d4 till the triangles in the last layer cannot be expanded, and optimizing all triangular meshes except the initial triangular mesh with a Local Optimization Procedure (LOP) algorithm.

the steps of generating a topological data structure of the profile map comprise:
  e1 generating a linear linked list database from the set of linear segments in the triangular meshwork generated in the step d5, and initializing the codes of the left region and the right region of all linear segments to valid information '−1';
  e2 selecting i linear segments from the line linked list randomly to form a polygon, searching for the boundaries of the polygon, and selecting the next linear segment and continuing this step if both the code of the left region and the right region of the current linear segment are not '−1'; terminating this step and continuing the next step, if the codes of the left region and the right region of all linear segments are not '−1', which indicates that the left region and the right region of linear segments have been searched; using tire ending point or starting point of the current linear segment as the current node lithe code of the left (or right) region of the current linear segment is not '−1', searching for the next linear segment in the linear linked list in the counter-clockwise direction, satin, the other end point of the next linear segment as the current node, and repeating the search till the search returns to the initial linear segment, thus forming a topological data structure of the high-precision profile map of the Delaunay triangular meshwork.

Beneficial effects: the present invention can provide high-precision navigation information for fully mechanized mining equipment, which is the premise and foundation for realizing underground unmanned mining, and mainly have the following advantages:

1) The present invention can provide accurate information on the thickness of coal seam, varying inclination angle of coal seam, and spatial locations of hazardous geological structures for fully mechanized mining equipment, and achieve the functions of high-precision positioning, information perception, path planning, etc., and provides a benchmark decision-making basis for unmanned mining;
2) The present invention can quickly fuse the data collected by in-seam seismograph, laser radar, integrated navigation device and ground penetrating radar, and automatically generate a high-precision three-dimensional navigation map of the fully mechanized mining face;
3) The data acquisition method in the present invention is simple, convenient to use and efficient, and the acquired measured data is accurate.

In the figures: 1—vehicle-mounted mobile measurement platform; 2—data receiving processor; 3—laser radar; 4—inertial navigation device; 5—ground penetrating radar.

EMBODIMENTS

Hereunder the present invention will be further detailed in embodiments with reference to the drawings.

Figure 1:
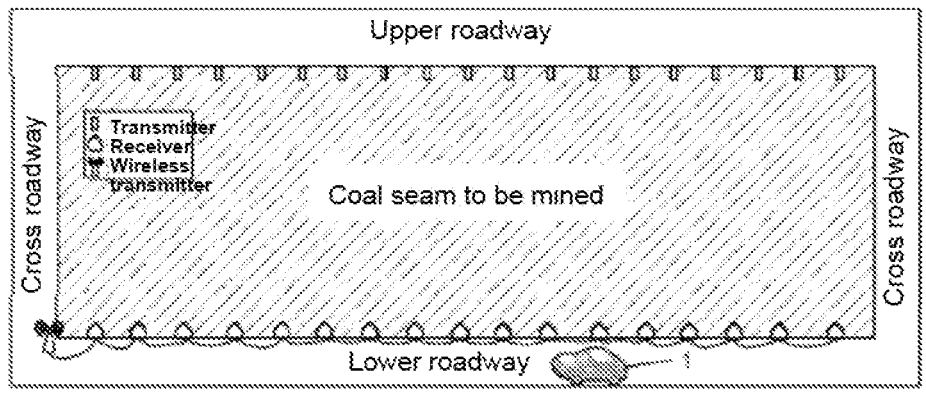
FIG. 1 is a layout view of a system for generating a high-precision three-dimensional navigation map of a fully mechanized mining face according to the present invention.

As shown in FIG. 1, a system for generating a high-precision three-dimensional navigation map of a fully mechanized mining face according to the present invention comprises a vehicle-mounted mobile measurement platform 1 and in-seam seismographs arranged on the two sides of a coal seam to be mined, wherein the in-seam seismograph comprises transmitters arranged at intervals in an upper roadway and receivers arranged at intervals in a lower roadway, and the receivers are connected with each other through network cables and connected with a wireless transmitter; the transmitters are in-seam seismic signal transmitters and the receivers are in-seam seismic signal receivers, the in-seam seismic signal receivers transmit data to the data receiving processor 2 via the wireless transmitter, and the in-seam seismic signal transmitters are arranged corresponding to the in-seam seismic signal receivers to form an in-seam seismic signal detection sequence.

Figure 2:
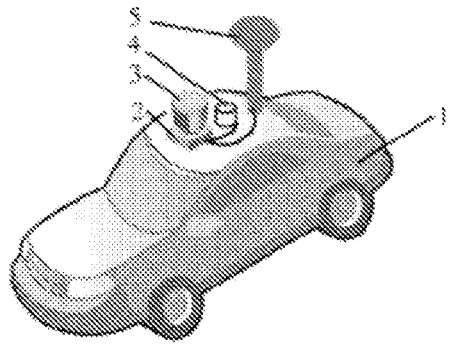
FIG. 2 is a layout view of the vehicle-mounted mobile measurement system according to the present invention.

As shown in FIG. 2, the vehicle-mounted mobile measurement platform 1 is provided with a data receiving processor 2, a laser radar 3, an inertial navigation device 4 and a ground penetrating radar 5, wherein the data receiving processor 2 and the ground penetrating radar 5 are fixed above the vehicle-mounted mobile measurement platform 1, the laser radar 3 is fixed above the data receiving processor 2, the inertial navigation device 4 is fixed at the center of the vehicle-mounted mobile measurement platform 1, the laser radar 3, the inertial navigation device 4 and the ground penetrating radar 5 transmit data with the data receiving processor 2 through the network cables, and a receiver of the in-seam seismograph transmits data with the data receiving processor 2 via the wireless transmitter.

Figure 3:
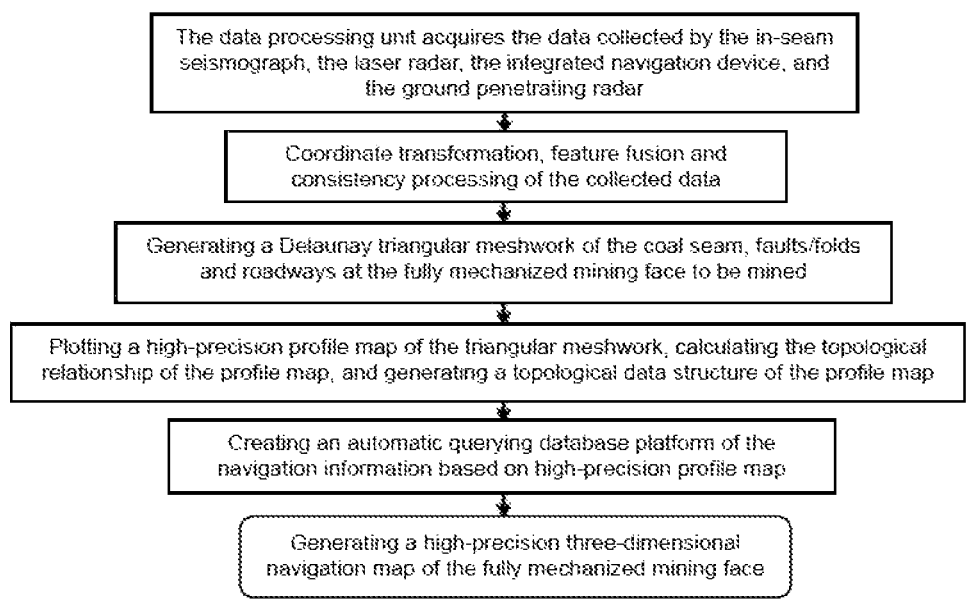
FIG. 3 is a flow view of the method for generating a high-precision three-dimensional navigation map of a fully mechanized mining face according to the present invention.

As shown in FIG. 3, a method for generating a high-precision three-dimensional navigation map of a fully mechanized mining face, comprises the following steps:

a. moving, the vehicle-mounted mobile measurement platform 1 at a constant speed of about 40 km/h in an upper roadway, a left cross roadway, a lower roadway and a right cross roadway around the coal seam to be mined;

b. moving the data receiving processor 2 to a location near the wireless transmitter along with the vehicle-mounted mobile measurement platform 1 to acquire the geological data of the coal seam to be mined collected by the in-seam seismographs by means of wireless signals, the geological data includes the thickness information of the coal seam to be mined, the varying inclination angle of the coal seam and the spatial locations of hazardous geological structures;

emitting a laser beam from the laser radar 3 to the surface of roadway roof continuously, and calculating the distance between the roadway surface and the laser radar according to the return time difference of the received reflected laser beam to form three-dimensional point cloud data of the roadway; transmitting the three-dimensional point cloud data from the laser radar 3 to the data receiving processor 2 through a network cable;

calculating the position, attitude and movement trajectory information of the vehicle-mounted mobile measurement platform 1 with the inertial navigation device 4 according to the rotational angular velocity and acceleration vector of the vehicle-mounted mobile measurement platform 1 relative to the inertial system, and then transmitting the information to the data receiving processor 2 through a network cable connection;

emitting electromagnetic wave signals from the ground penetrating radar 5 to the coal seam at the roadway roof via an emitter unit, and accurately calculating the thickness data of the remaining coal in the upper and lower roadway roofs of the fully mechanized mining face with a receiver unit by detecting the propagation time of the electromagnetic wave signals in the coal seam, and transmitting the data to the data receiving processor 2 through a network cable connection;

c. carrying out coordinate transformation, feature fusion and consistency processing on the data collected by the vehicle-mounted mobile measurement platform 1 and the in-seam seismographs; the method for carrying out coordinate transformation, feature fusion and consistency processing on the data collected by the vehicle-mounted mobile measurement platform 1 and the in-seam seismographs is as follows: first, formulating identical and similar attribute features by categorizing and classifying the collected data elements and mapping the feature attributes according to the invariable features of the fully mechanized mining face, organizing and expressing the attribute features with the least square method, and establishing an attribute feature conversion table to eliminate the differences in the attribute features resulted from different categorization and classification criteria and thereby achieve consistency of the collected data in feature expression; then, combining the collected data attribute features with a method based on entity matching with the same names; specifically, a seven-parameter coordinate transformation method is used for the coordinate transformation:

$$\begin{pmatrix} X \\ Y \\ Z \end{pmatrix} = (1+m) \begin{pmatrix} X' \\ Y' \\ Z' \end{pmatrix} + \begin{pmatrix} 0 & \varepsilon_Z & -\varepsilon_Y \\ -\varepsilon_Z & 0 & \varepsilon_X \\ \varepsilon_Y & -\varepsilon_X & 0 \end{pmatrix} \begin{pmatrix} X' \\ Y' \\ Z' \end{pmatrix} + \begin{pmatrix} \Delta X \\ \Delta Y \\ \Delta Z \end{pmatrix}$$

where, $(X, Y, Z)^T$ are the three-dimensional coordinates of the coal seam to be mined, $(X', Y', Z')^T$ are the three-dimensional coordinates of the laser-scanned roadway; $\Delta X$, $\Delta Y$ and $\Delta Z$ are translation parameters between the two origins of coordinates, $\varepsilon_X$, $\varepsilon_Y$ and $\varepsilon_Z$ are rotation parameters of the three coordinate axes, and in is a scale parameter:

wherein the feature fusion method of the data collected by the vehicle-mounted mobile measurement platform 1 and the in-seam seismographs employs at least one of the following methods for fusion: the parameterized template method, the feature compression and clustering algorithm, the lam-order nearest neighbor approximation algorithm, the artificial neural network and the fuzzy integral method:

d. processing the data collected by the vehicle-mounted mobile measurement platform 1 and the in-seam seismographs by using the data receiving processor 2, and generating a Delaunay triangular meshwork of the coal seam, faults/folds and roadways at the fully mechanized mining face to be mined respectively; the steps of generating a Delaunay triangular meshwork of the coal seam, faults/folds and roadways at the fully mechanized mining face to be mined comprise the following steps:

d1 first, sorting all the data involved in the network construction, including the data of the coal seam, faults/folds and roadways scanned by the laser radar and roof data detected by the ground penetrating radars in an ascending order and in a sequence of coordinate X, then coordinate Y and then coordinate Z, and then storing the sorted data in a point data linked list;

d2 creating a point data grid index according to the point data linked list, managing the point data in blocks, and storing the constraint edges in a linear linked list;

d3 sequentially retrieving the constraint edges as base edges from the linear linked list, applying a maximum included angle criterion to generate left triangle and right triangle as an initial triangular mesh or generate a triangle if the constraint edges are boundaries, and storing the triangle in the initial triangular mesh;

d4 using the three edges of a layer of triangles newly generated in the step d3 as base edges, and generating a new triangular meshwork with a one-step growth method: retrieving a base edge, finding out a third point that constitutes a triangle with the base line under a constraint circle criterion for constrained Delaunay triangulation, connecting the two end points of the base line with the third point to form a new triangle, and storing the new triangle in the triangular meshwork till the expansion edge of the new triangle is a boundary edge or has been used twice;

d5 repeating the step d4 till the triangles in the last layer cannot be expanded, and optimizing all triangular meshes except the initial triangular mesh with a Local Optimization Procedure (LOP) algorithm:

e. utilizing the Delaunay triangular meshwork of the coal seam, faults/folds and roadways generated in the step d to plot a high-precision profile map of the Delaunay triangular meshwork, calculating the topological relationship of the profile map, and generating a topological data structure of the profile map; the steps of generating a topological data structure of the profile map comprise:

e1 generating a linear linked list database from the set of linear segments in the triangular meshwork generated in the step d5, and initializing the codes of the left region and the right region of all linear segments to valid information '−1';

e2 selecting i linear segments from the linear linked list randomly to form a polygon, searching for the boundaries of the polygon, and selecting the next linear segment and continuing this step if both the code of the left region and the right region of the current linear segment are not '−1'; terminating this step and continuing the next step. if the codes of the left region and the right region of all linear segments are not '−1', which indicates that the left region and the right region of all linear segments have been searched; using the ending point or starting point of the current linear segment as the current node if the code of the left (or right) region of the current linear segment is not '−1', searching for the next linear segment in the linear linked list in the counter-clockwise direction, setting the other end point of the next linear segment as the current node, and repeating the search till the search returns to the initial linear segment, thus forming a topological data structure of the high-precision profile map of the Delaunay triangular meshwork;

f. establishing an automatic querying database of the navigation information of the fully mechanized mining face to be mined, including the querying for thickness of coal seam, inclination angle of coal seam, spatial locations of faults/folds and spatial locations of roadways, and generating a high-precision three-dimensional navigation map of the fully mechanized tinning face, according to the data collected by the vehicle-mounted mobile measurement platform 1 and the in-seam seismographs and the created Delaunay triangular meshwork and high-precision profile map of the coal seam, faults/folds and roadways at the fully mechanized mining face.

The invention claimed is:

1. A system for generating a three-dimensional navigation map of a fully mechanized mining face, comprising a vehicle-mounted mobile measurement platform (1) and in-seam seismographs arranged on two sides of a coal seam to be mined, wherein the in-seam seismographs comprise transmitters arranged at intervals in an upper roadway and receivers arranged at the intervals in a lower roadway, and the receivers are connected with each other through network cables and connected with a wireless transmitter:

the vehicle-mounted mobile measurement platform (1) is provided with a data receiving processor (2), a laser radar (3), an inertial navigation device (4) and a ground penetrating radar (5), wherein the data receiving processor (2) and the ground penetrating radar (5) are fixed above the vehicle-mounted mobile measurement platform (1), the laser radar (3) is fixed above the data receiving processor (2), the inertial navigation device (4) is fixed at a center of the vehicle-mounted mobile measurement platform (1), the laser radar (3), the inertial navigation device (4) and the ground penetrating radar (5) transmit data with the data receiving processor (2) through the network cables, and a receiver of the in-seam seismograph transmits data with the data receiving processor (2) via the wireless transmitter.

2. The system for generating the three-dimensional navigation map of the fully mechanized mining face according to claim 1, wherein the transmitters are in-seam seismic signal transmitters and the receivers are in-seam seismic signal receivers, the in-seam seismic signal receivers transmit the data to the data receiving processor (2) via the wireless transmitter, and the in-seam seismic signal transmitters are arranged corresponding to the in-seam seismic signal receivers to form an in-seam seismic signal detection sequence.

3. A method for generating the three-dimensional navigation map of the fully mechanized mining face using the system for generating the three-dimensional navigation map of the fully mechanized mining face according to claim 1, comprising the following steps:

a. moving the vehicle-mounted mobile measurement platform (1) at a constant speed of about 40 km/h in the upper roadway, a left cross roadway, the glower roadway and a right cross roadway around the coal seam to be mined;

b. moving the data receiving processor (2) to a location near the wireless transmitter along with the vehicle-mounted mobile measurement platform (1) to acquire geological data of the coal seam to be mined collected by the in-seam seismographs by means of wireless signals, the geological data includes thickness information of the coal seam to be mined, varying inclination angle of the coal seam and spatial locations of hazardous geological structures;

emitting a laser beam from the laser radar (3) to a surface of roadway roof continuously, and calculating a distance between the surface of the roadway roof and the laser radar according to a return time difference of a received reflected laser beam to form three-dimensional point cloud data of the roadway roof; transmitting the three-dimensional point cloud data from the laser radar (3) to the data receiving processor (2) through a network cable;

calculating position, attitude and movement trajectory information of the vehicle-mounted mobile measurement platform (1) with the inertial navigation device (4) according to rotational angular velocity and acceleration vector of the vehicle-mounted mobile measurement platform (1) relative to an inertial system, and then transmitting the position, attitude and movement trajectory information to the data receiving processor (2) through the network cable;

emitting electromagnetic wave signals from the ground penetrating radar (5) to the coal seam at the roadway roof via an emitter unit, and calculating thickness data of remaining coal in upper and lower roadway roofs of the fully mechanized mining face with a receiver unit by detecting a propagation time of the electromagnetic wave signals in the coal seam, and transmitting the thickness data to the data receiving processor (2) through network cable;

c. carrying out coordinate transformation, feature fusion and consistency processing on the data collected by the vehicle-mounted mobile measurement platform (1) and the in-seam seismographs;

d. processing the data collected by the vehicle-mounted mobile measurement platform (1) and the in-seam seismographs by using the data receiving processor (2), and generating a Delaunay triangular meshwork of the coal seam, faults/folds and roadways at the fully mechanized mining face to be mined respectively;

e. utilizing the Delaunay triangular meshwork of the coal seam, faults/folds and roadways generated in the step d to plot a profile map of the Delaunay triangular meshwork, calculating topological relationship of the profile map, and generating a topological data structure of the profile map;

f. establishing an automatic querying database of navigation information of the fully mechanized mining face to be mined, including querying for thickness of the coal seam, inclination angle of the coal seam, spatial locations of faults/folds and spatial locations of roadways, and generating the three-dimensional navigation map of the fully mechanized mining face, according to the data collected by the vehicle-mounted mobile measurement platform (1), the in-seam seismographs, the Delaunay triangular meshwork and the profile map of the coal seam, faults/folds and roadways at the fully mechanized mining face.

4. The method for generating the three-dimensional navigation map of the fully mechanized coal mining face according to claim 3, wherein the coordinate transformation, the feature fusion and the consistency processing of the data collected by the vehicle-mounted mobile measurement platform (1) and the in-seam seismographs is as follows: first, formulating identical and similar attribute features by categorizing and classifying collected data elements and mapping the attribute features according to invariable features of the fully mechanized mining face, organizing and expressing the attribute features with a least square method, and establishing an attribute feature conversion table to eliminate differences in the attribute features resulted from different categorization and classification criteria and thereby achieve consistency of the data in feature expression; then, combining the attribute features with a method based on entity matching with same names;

specifically, a seven-parameter coordinate transformation method is used for the coordinate transformation:

$$\begin{pmatrix} X \\ Y \\ Z \end{pmatrix} = (1+m) \begin{pmatrix} X' \\ Y' \\ Z' \end{pmatrix} + \begin{pmatrix} 0 & \varepsilon_Z & -\varepsilon_Y \\ -\varepsilon_Z & 0 & \varepsilon_X \\ \varepsilon_Y & -\varepsilon_X & 0 \end{pmatrix} \begin{pmatrix} X' \\ Y' \\ Z' \end{pmatrix} + \begin{pmatrix} \Delta X \\ \Delta Y \\ \Delta Z \end{pmatrix}$$

where, (X, Y, Z) are three-dimensional coordinates of the coal seam to be mined, (X', Y', Z') are three-dimensional coordinates of a laser-scanned roadway; $\Delta X$, $\Delta Y$ and $\Delta Z$ are translation parameters between two origins of coordinates, $\varepsilon_X$, $\varepsilon_Y$, and $\varepsilon_Z$ are rotation parameters of three coordinate axes, and m is a scale parameter;

wherein the feature fusion method of the data collected by the vehicle-mounted mobile measurement platform (1) and the in-seam seismographs employs at least one of the following methods for fusion: a parameterized template method, a feature compression and clustering algorithm, a K-order nearest neighbor approximation algorithm, an artificial neural network and a fuzzy integral method.

5. The method for generating the three-dimensional navigation map of the fully mechanized mining face according to claim 3, wherein the step of generating the Delaunay triangular meshwork of the coal seam, faults/folds and roadways at the fully mechanized mining face to be mined comprise:

d1 first, sorting the data involved in network construction, including the data of the coal seam, faults/folds, and roadways scanned by the laser radar and roof data detected by the ground penetrating radar, in an ascending order and in a sequence of coordinate X, then coordinate Y and then coordinate Z, and then storing the sorted data in a point data linked list;

d2 creating a point data grid index according to the point data linked list, managing point data in blocks, and storing constraint edges in a linear linked list;

d3 sequentially retrieving the constraint edges as base edges from the linear linked list, applying a maximum included angle criterion to generate left triangle and right triangle as an initial triangular mesh, or generate a triangle if the constraint edges are boundaries, and storing the left triangle, the right triangle, or the triangle in the initial triangular mesh;

d4 using three edges of a layer of triangles newly generated in the step d3 as the base edges, and generating a new triangular meshwork with a one-step growth method: retrieving a base edge, finding out a third point that constitutes a triangle with a base line under a constraint circle criterion for constrained Delaunay triangulation, connecting two end points of the base line with a third point to form a new triangle, and storing the new triangle in the new triangular meshwork till an expansion edge of the new triangle is a boundary edge or has been used twice;

d5 repeating the step d4 till the triangles in a last layer cannot be expanded, and optimizing all triangular meshes except the initial triangular mesh with a Local Optimization Procedure (LOP) algorithm.

6. The method for generating the three-dimensional navigation map of the fully mechanized mining face according to claim 5, wherein the step of generating the topological data structure of the profile map comprise:

e1 generating a linear linked list database from a set of linear segments in the triangular meshwork generated in the step d5, and initializing codes of left regions and right regions of all linear segments to valid information '−1';

e2 selecting i linear segments from the linear linked list randomly to form a polygon, searching for boundaries of the polygon, and selecting a next linear segment and continuing this step if both a code of a left region and a code of a right region of a current linear segment are not '−1'; terminating this step and continuing a next step, if the codes of the left regions and the right regions of all linear segments are not '−1', which indicates that the left regions and the right regions of all linear segments have been searched; using an ending point or starting point of the current linear segment as a current node if the code of the left region or the code of the right region of the current linear segment is not '−1', searching for the next linear segment in the linear linked list database in a counter-clockwise direction, setting other end point of the next linear segment as the current node, and repeating the search till the search returns to an initial linear segment, thus forming the topological data structure of the profile map of the Delaunay triangular meshwork.

* * * * *